Oct. 10, 1939.  F. W. MEREDITH ET AL  2,175,405
ANTIVIBRATION MOUNTING
Filed July 7, 1937
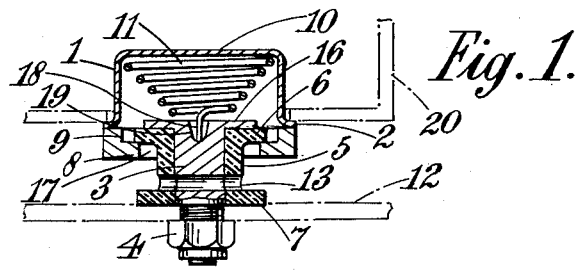
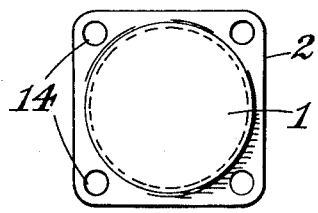
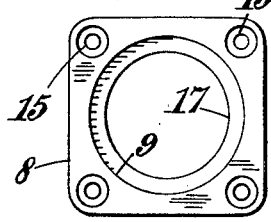
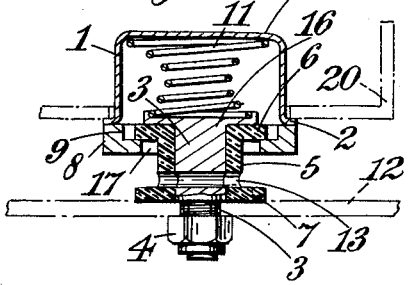
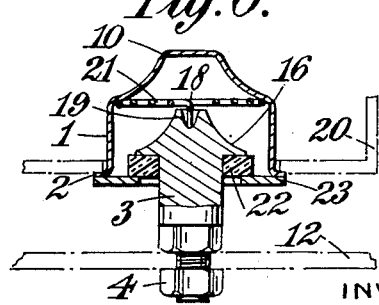
INVENTORS
FREDERICK WILLIAM MEREDITH
AND JEFFERY WALTON BARNES
By Stebbins, Blenko & Parmelee
ATTORNEYS

Patented Oct. 10, 1939

2,175,405

UNITED STATES PATENT OFFICE 2,175,405

ANTIVIBRATION MOUNTING

Frederick William Meredith and Jeffery Walton Barnes, South Farnborough, England, assignors to S. Smith & Sons (Motor Accessories) Limited, London, England, a British company Application July 7, 1937, Serial No. 152,308
In Great Britain March 12, 1936

7 Claims. (Cl. 248—358)

This application corresponds to the application of Frederick William Meredith and Jeffery Walton Barns, Serial No. 7418/36, which was filed in Great Britain on March 12, 1936.

This invention relates to anti-vibration mounting devices and more particularly to such devices which are suitable for insulating from vibration an instrument or instrument panel, for example, in aircraft, though its application is not restricted thereto. In such devices it is desirable and usual to employ springs having flexibility in all directions and such that the natural frequencies of oscillation of the instrument or other apparatus supported are less than the higher frequencies of vibration of the aircraft or other supporting structure, which higher frequencies if applied to the supporting apparatus, might damage it owing to the large accelerations involved.

In cases where it has been desired to insulate from vibration apparatus of different weights it has been usual to employ mountings or devices having springs of different stiffnesses to suit the different weights, the aim being in general to provide a mounting giving the apparatus supported a substantially constant natural frequency for any particular direction of linear oscillation, whatever, within limits, the weight of the apparatus may be. This has necessitated that a large stock of springs be kept on hand of different stiffnesses.

According to this invention, an anti-vibration mounting device embodying a spring for location between a support and the apparatus to be supported is characterised in that means controlled by the deflection of the spring are arranged to vary the stiffness thereof, which spring and the means for varying its stiffness are designed to maintain the frequency of vibration of the free oscillation of the supported apparatus constant for a variation in the mass of the supported apparatus. Thus, the same spring may be used for a large range of weights of apparatus supported since, the greater the weight of the supported apparatus the greater will be the stiffness of the spring. As indicated above, the frequency of vibration is preferably maintained at a value less than that of the important vibration to which the device as a whole is subjected. Preferably, the variation of the stiffness of the spring is effected by means which are arranged to vary the length of the free or unsupported part of the spring. The spring mounting is so designed that the stiffness of the spring is altered upon change in force applied to the spring and so that the stiffness is directly proportional to the force. As the force applied to the spring is dependent upon the mass or apparatus supported, the stiffness of the spring will be directly proportional to this weight and, therefore, the natural frequency of vibration will be independent of the mass of the apparatus supported and, therefore, constant.

It may be preferable in certain cases to arrange that the frequency for the vibrations in one direction shall be different from that in another direction. This may be readily effected according to the present invention by the employment of a spring of spiral conical form which, if desired, may be provided at one end with a straight axial portion, the length of which axial portion influences the frequency of the lateral vibrations.

When employing a spring of spiral form, the increase in the stiffness of the spring, upon increase of deflection, may be effected by arranging an abutment face at either or each end of the spring so as to contact with an increasing length of the convolutions as the compression of the spring takes place. The aforesaid abutment face may either be a flat end arranged normally to the axis of the spring or it may be convexly or concavely shaped so as to extend axially towards or away from the convolutions of the spring according to the nature of the conical spiral.

The following is a description of an anti-vibration mounting device suitable for the mounting of instruments in aircraft, reference being made to the accompanying drawing, in which:—

Figure 1 is a sectional elevation of the device,

Figure 2 shows an alternative form of abutment at one end of the spring shown in Figure 1, Figure 3 is a top plan view of the construction shown in Figure 1, Figure 4 is a plan view of a reversible stop plate for limiting the extent of movement of the device, and Figures 5 and 6 are similar views to Figure 1 but showing different types of springs.

Like references refer to like parts in the various figures of the drawing.

The anti-vibration mounting device comprises a cylindrical metal casing 1 having a flange portion 2. Arranged axially with respect to the casing 1 is a stud 3 having a screw-threaded portion at its lower end to receive a nut 4. A rubber sleeve 5, having flanges 6 and 7 at its ends, surrounds the stud 3 which stud is provided with a head 16 which rests on the flange 6. A reversible stop-plate 8 having a recess 9 and an aperture 17 is fixed to the casing 1 in a manner hereinafter described. A wire conical spiral spring 11 is disposed between the head 16 of the stud 3 and an abutment face 10 which constitutes an end wall of the casing 1. As shown in Figure 1, the abutment face is flat and is disposed at rightangles to the axis of the spring. In Figure 2, however, the abutment face is convexly shaped to extend axially within the convolutions of the spring. The apex of the spring is formed with a straight piece of wire 18 which extends into a comparatively deep conical recess 19 formed in the head 16.

The device is clamped by means of a nut 4 to a support 12 (indicated in chain lines) which may be, for example, a bracket on the aircraft. A hole 13 extends diametrically through the sleeve and stud 3 into which hole a tommy-bar may be inserted to prevent the stud 3 from turning during the tightening of the nut 4. An instrument panel 20 or other part to be insulated from the vibration of the support 12 is attached to the casing 1 as follows. As seen in Figure 3, holes 14 are formed in the flange 2 on the casing 1, and similar holes 15, countersunk at each end, are formed in the reversible plate 8. Screws are arranged to extend through the aforementioned holes and engage threaded holes formed in the instrument panel 20. The external diameter of the flange 6 is larger than the diameter of the aperture 17 and thus the head 16 is prevented from being forced out of the casing 1 through the aperture by the spring.

The flat surfaces on the reversible plate 8 adjacent to the aperture 17 may make contact with the flanges 6 and 7 of the sleeve 5, so limiting the possible relative axial movement between the casing 1 and the stud 3.

As shown in Figures 1 and 5 the reversible plate 8 is assembled with the recess 9 uppermost and relative axial freedom between the casing 1 and the stud 3 will be possible for a series of relatively light loads applied to the mounting. When, however, the reversible plate 8 is assembled with the recess 9 downwards, the spring will be initially compressed and relative axial freedom between the casing 1 and the stud 3 will be possible for a series of relatively heavy loads applied to the mounting.

A number of such devices, for example three, may be employed as the sole means for securing the instrument panel 20 to the support 12.

Assuming the spring is disposed about a vertical axis, it will be appreciated that a greater or lesser length of the convolutions of the spring will rest on the abutment face 10 according to the weight of the instrument panel 20 which is supported thereby. As already indicated earlier in the specification the abutment face 10 may be flat or convexly curved in accordance with the characteristics of the spring in order to maintain the frequency of vibration constant for any loading. In the arrangement shown in Figures 1 and 2, on equal deflection, a greater length of the spring will be brought into contact with the abutment face in the construction of the latter figure.

For a spring constructed from wire of uniform cross-section and for use with a flat abutment face in the manner referred to above, there are many possible forms of spring giving a substantially constant natural frequency of oscillation for a range of supported weights. One such form has a constant axial pitch P and an orthogonal projection of the spring on said flat face in the form of an equiangular or logarithmic spiral. This may be expressed by the equation:—

$$R = R_0 e^{-\mu\theta}$$

where $R$ and $\theta$ are the polar co-ordinates, $R_0$ is the radius vector of the outer end of the spiral, $e$ is the exponential constant and $$\mu = \frac{4\pi f^2 P}{6g}$$

where $f$ is the desired frequency of vibration. The above equations need apply only to that portion of the spring which is sometimes in contact with the abutment face and sometimes not, according to the applied load.

The effective stiffness of the spring for lateral vibration can be obtained by selecting a particular length of the straight portion 18, which length may be found by experiment.

Other forms of spring may be employed than that shown in Figure 1 of the drawing, for example, an hour-glass-shape spring may be used as shown in Figure 5 in which case the coils of the spring may be brought into contact with abutment faces at each end of the spring. Such an arrangement may allow of a spring of less maximum diameter being employed.

In the construction shown in Figure 6 the spring 21 when in an unloaded or weakly loaded condition is in the form of a spiral, but when loaded is distorted into a spiral conical form. In this arrangement the metal casing requires to be provided with a concave abutment face 10 which contacts with an increasing length of the outer coils as the weight of the instrument panel is increased. In this construction the reversible stop plate and the rubber sleeve have been omitted and replaced respectively by the plate 23 and a rubber washer 22 which is disposed between the head 16 and the plate 23.

We claim:

1. An anti-vibration mounting for mounting apparatus on a body subject to vibration, including a device adapted to be interposed between a support and a supported body, said device comprising a casing having an opening at one end and an abutment extending across the opposite end, a member projecting into the casing and having a head providing an abutment disposed in the casing at the open end, a stop-plate secured to the casing at the open end, the stop-plate having an opening therein through which the projecting member extends, means for limiting relative axial movement between the casing and the projecting member, a coil spring interposed between the said abutments and disposed coaxially with the projecting member for resisting relative axial movement of the abutments towards each other, said spring having convolutions which, when projected on a plane at right angles to the axis of the spring, form a logarithmic spiral, the convolutions being spaced apart so that they do not touch each other when the spring is compressed and when the spring is compressed an increasing length of the convolutions engage one of said abutments, whereby the natural frequency of vibration is maintained substantially constant irrespective of the load on the spring.

2. An anti-vibration mounting for mounting apparatus on a body subject to vibration, including a device adapted to be interposed between a support and a supported body, said device comprising a casing having an opening at one end and an abutment extending across the opposite end, a member projecting into the casing and having a head providing an abutment disposed in the casing at the open end, a resilient sleeve surrounding the projecting member and having an outwardly directed flange, a stop-plate secured to the casing at the open end, the stop-plate having an opening therein through which the projecting member and the resilient sleeve extend, the opening being larger in diameter than the outside diameter of the sleeve, but smaller than the outside diameter of the flange, said stop-plate and sleeve cooperating to limit relative movement between the projecting member and the casing, a coil spring interposed between the said abutments and disposed coaxially with the projecting member for resisting relative axial movement of the abutments towards each other, said spring having convolutions which, when projected on a plane at right angles to the axis of the spring, form a logarithmic spiral, the convolutions being spaced apart so that they do not touch each other when the spring is compressed and when the spring is compressed an increasing length of the convolutions engage one of said abutments, whereby the natural frequency of vibration is maintained substantially constant irrespective of the load on the spring.

3. An anti-vibration mounting for mounting apparatus on a body subject to vibration, including a device adapted to be interposed between a support and a supported body, said device comprising a casing having an opening at one end and an abutment extending across the opposite end, a member projecting into the casing and having a head providing an abutment disposed in the casing at the open end, a stop-plate secured to the casing at the open end, the stop-plate having an opening therein through which the projecting member extends, resilient means interposed between the projecting member and the stop-plate for limiting relative movement between the casing and the projecting member, a coil spring interposed between the said abutments and disposed coaxially with the projecting member for resisting relative axial movement of the abutments towards each other, said spring having convolutions which, when projected on a plane at right angles to the axis of the spring, form a logarithmic spiral, the convolutions being spaced apart so that they do not touch each other when the spring is compressed and when the spring is compressed an increasing length of the convolutions engage one of said abutments, said spring having an axially extending stem which engages the other of said abutments, whereby the spring serves to restrain relative movement of the casing and projecting member both in the axial direction of the spring and in a direction transverse thereto.

4. An instrument mounting comprising a device adapted to be interposed betwen an instrument and the structure on which said instrument is carried, said device comprising telescopically arranged members having opposed abutments thereon and a coiled spring interposed between said abutments to resiliently resist relative telescopic movement of said members in one direction and return the members to a normal position after they have been moved, said spring being conical and having a straight axial portion increasing length of the convolutions engages one of said abutments and arranged with the larger end against the other said abutment, said spring being made from wire of uniform cross-section and having coils arranged to engage one of the abutments in succession as the spring is compressed, the convolutions of the spring forming a logarithmic spiral when projected orthogonally, whereby the natural frequency of oscillation of the supported instrument is substantially independent of the mass thereof.

5. An anti-vibration mounting for mounting apparatus on a body subject to vibration, including a device adapted to be interposed between a support and a supported body, said device comprising a cup-shaped member, a stud arranged coaxially with said cup-shaped member and having a head disposed in the mouth thereof, a resilient sleeve surrounding the stud and having an outwardly directed flange formed at each end thereof, a reversible stop-plate secured to the mouth of the cup-shaped member and provided with a flange for engaging the flanges on the sleeve to limit relative movement between the casing and the stud, and having an opening through which the stud extends, a conical spiral spring disposed between the head and the end wall of the cup-shaped member, said spring having spaced apart convolutions which when projected orthogonally form a logarithmic spiral, so that when the spring is compressed an increasing length of the convolutions of the spring contact the end wall, whereby the natural frequency of vibration is maintained substantially constant, irrespective of the load on the spring, said reversible stop-plate having a depressed annular portion around the opening so that the initial compression of the spring can be varied by reversing the stop-plate.

6. A device as set forth in claim 1 in which the spring is of hour-glass shape and coiled with a constant axial pitch both ends of the spring having an orthogonal projection in the form of a logarithmic spiral, the coils being spaced apart so that they do not touch when the spring is compressed and which coils successively engage the abutments as the spring is compressed.

7. A device as set forth in claim 1 in which one of said abutments is dished.

FREDERICK WILLIAM MEREDITH.
JEFFERY WALTON BARNES.